United States Patent [19]
Tamai

[11] Patent Number: 5,648,837
[45] Date of Patent: Jul. 15, 1997

[54] SUPPORT SYSTEM FOR PAPER MAGAZINE

[75] Inventor: Masayuki Tamai, Wakayama, Japan

[73] Assignee: Noritsu Koki Co., Ltd., Wakayama, Japan

[21] Appl. No.: 339,252

[22] Filed: Nov. 10, 1994

[30] Foreign Application Priority Data

Nov. 10, 1993 [JP] Japan ................... 5-281184

[51] Int. Cl.$^6$ ............... G03B 1/00; G03B 27/46
[52] U.S. Cl. ............... 355/72; 101/232; 271/162
[58] Field of Search ............... 355/72, 309; 101/232; 271/162

[56] References Cited

U.S. PATENT DOCUMENTS 5,187,531  2/1993  Ozawa et al. ............... 355/308
5,335,045  8/1994  Kunz et al. ............... 355/72
5,362,008  11/1994  Nagel et al. ............... 242/147

*Primary Examiner*—Matthew S. Smith
*Assistant Examiner*—David A. Lane
*Attorney, Agent, or Firm*—Wenderoth, Lind & Ponack

[57] ABSTRACT

A support system for a paper magazine has a support surface adjacent to a paper feed box. An upper paper guide and a lower paper guide are arranged over the support surface before a paper inlet of the paper feeder box. A pair of magazine guides are mounted on the support surface 3 for guiding both sides of the paper magazine during loading thereof. A lock cam can engage with and disengage from a cam engaging projection of the paper magazine, and is urged by the force of a spring to press the cam engaging projection towards the paper feeder box. A lever holding mechanism holds the lock cam in its unlocked position after a return movement of a swing arm is completed.

6 Claims, 7 Drawing Sheets

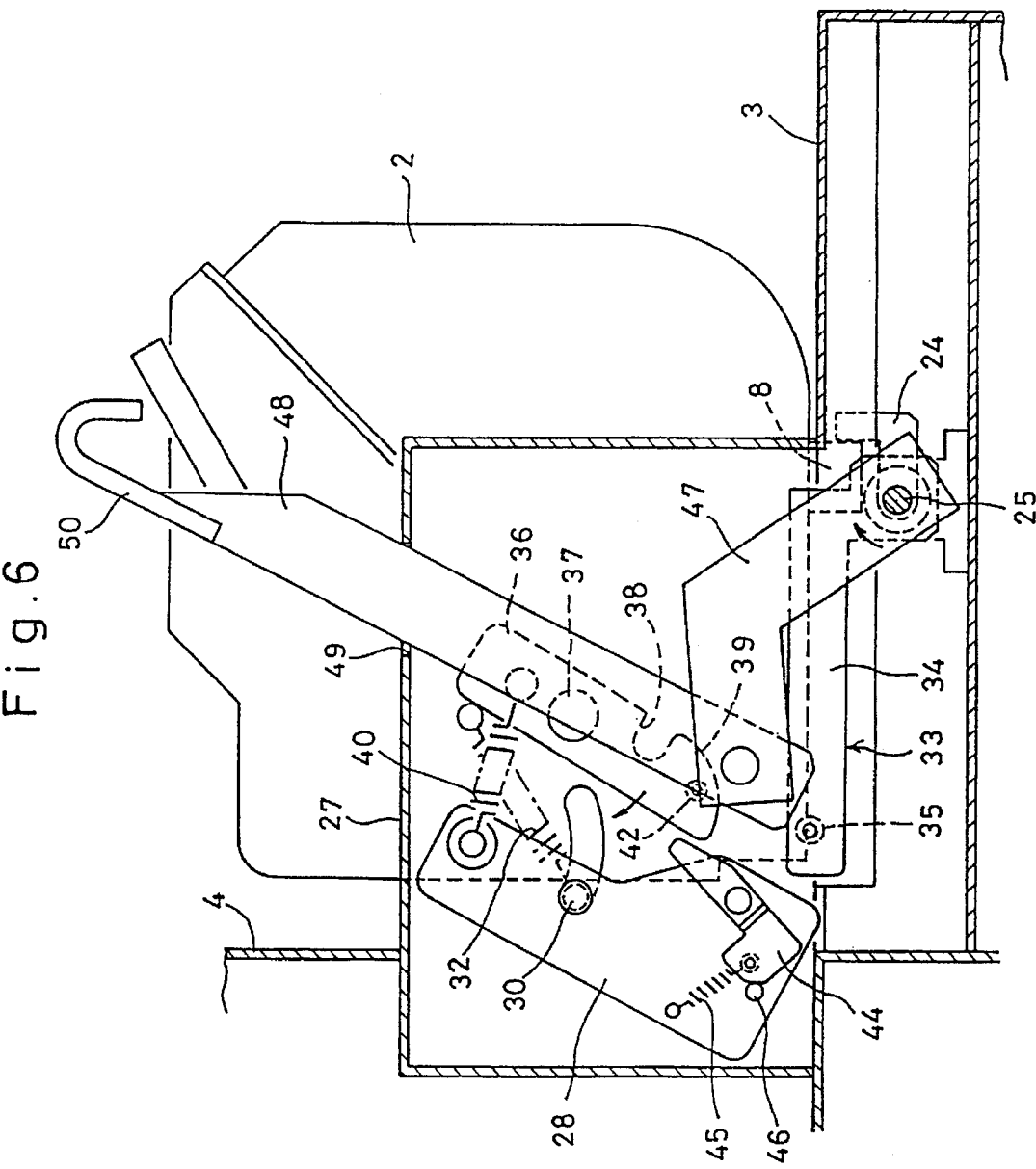

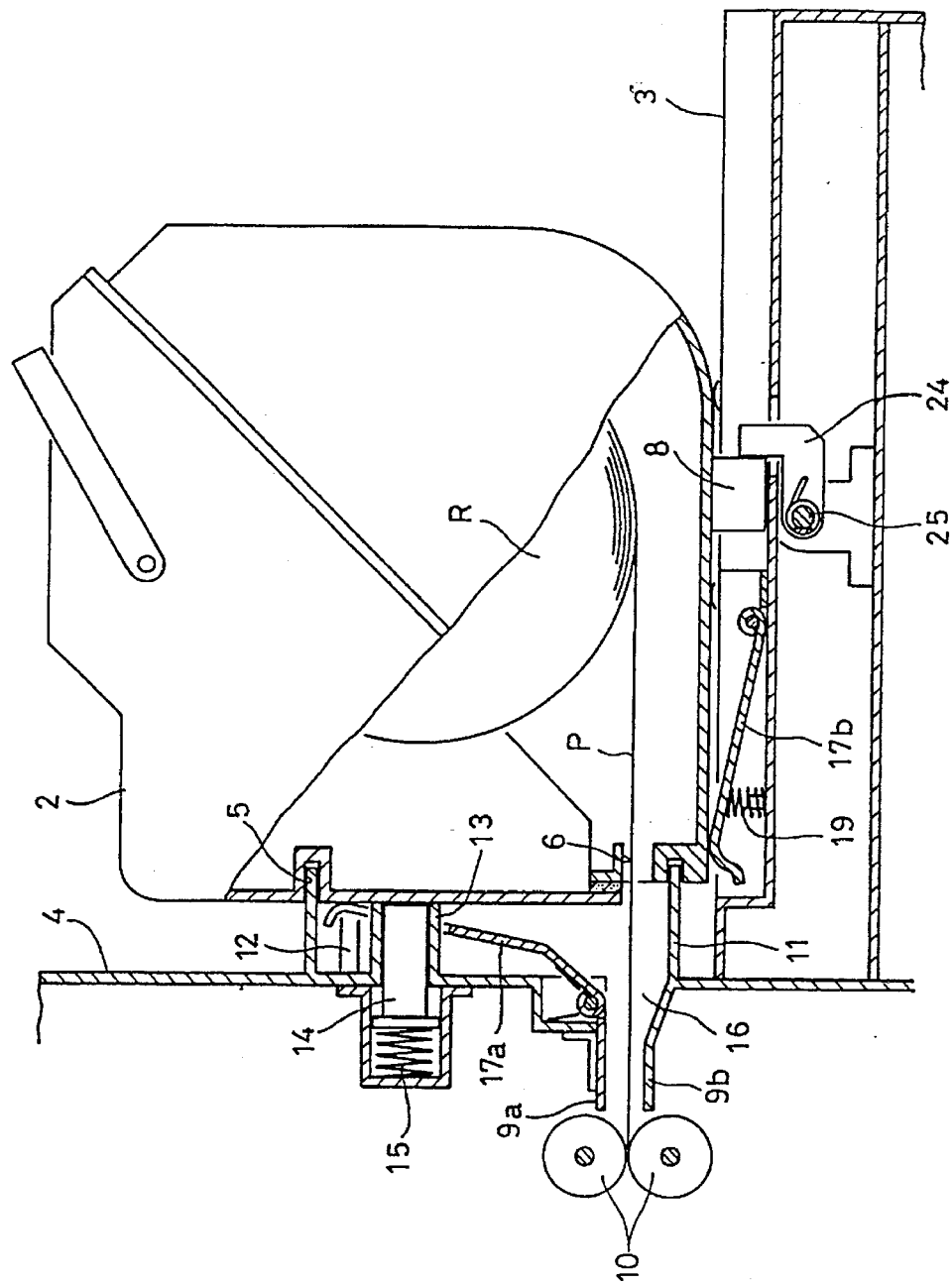

SUPPORT SYSTEM FOR PAPER MAGAZINE

BACKGROUND OF THE INVENTION

The present invention relates to a support system for supporting a paper magazine carrying a roll of photographic printing paper.

There are known photograph printers for exposing a tape of photographic paper (referred to as a paper) to optical images of a negative film and subjecting it to a developing process for reproducing photographic images. In the printing operation, the paper, wound on a reel, is commonly stored in and drawn out from a paper magazine, which is loaded on an enclosure of an exposure unit.

The paper magazine needs to be supplied with a new roll of the paper upon consumption of the paper. Also, when a different print size is requested, the paper magazine has to be replaced with one suited for the size. It is therefore essential to provide a support system for easing the loading and unloading of the paper magazine on the enclosure.

In a prior art system, a vertically placed paper feeder box for communication with the paper magazine and a pair of magazine guides for guiding the passage of the paper magazine are provided on an approximately horizontal support surface. For loading, the paper magazine is moved along and between the two magazine guides to the paper feeder box so that a paper outlet, arranged in the upper front end of the paper magazine, comes to face a paper inlet provided in the upper feeding side of the paper feeder box. When the paper magazine is placed in its loaded position, it is locked, by a locking mechanism.

The paper inlet of the paper feeder box of the prior art system as noted, is located in the upper feeding side thereof. The leading end of the paper released from the paper output of the paper magazine tends to go downward, as it has been wound on a reel, and has to be lifted up by hand to feed it into the paper inlet of the paper feeder box while the paper magazine is being advanced on the support surface towards the paper feeder box to its loading position. This loading action requires a considerable length of time, with troublesome adjustment.

In addition, the paper outlet of the paper magazine is also located in the upper front side thereof. If the paper magazine is tilted due to mechanical gaps between the feet of the paper magazine and the magazine guides, its paper outlet become misalignment with the paper inlet of the paper feeder box, thus preventing the leading end of the paper from feeding from the paper inlet to a pair of advance rollers in the paper feeder box. As the paper magazine is biased between the two magazine guides due to the mechanical gaps, it will hardly permit a feeding action of the paper with the desired accuracy.

OBJECT OF THE INVENTION

It is an object of the present invention to provided a support system for a paper magazine in which paper is accurately transferred.

SUMMARY OF THE INVENTION

For elimination of the foregoing drawbacks, a support system according to the present invention comprises a support surface of an enclosure of an exposure unit on which a paper magazine having a paper outlet provided in the lower front side thereof and a cam engaging projection mounted to the bottom side thereof, a paper feeder box disposed vertically at the front end of the support surface, two, upper and lower, paper guides arranged over the support surface before the paper inlet of the paper feeder box and urged by springs for vertical swing movements, a pair of magazine guides mounted on the support surface for guiding both sides of the paper magazine during the loading, a lock cam mounted between the two magazine guides and below the support surface for swing movements to engage with and disengage from the cam engaging projection of the paper magazine and urged by the yielding force of a spring to press the cam engaging projection towards the paper feeder box, a swing arm provided beside the passage of the paper magazine for return movement by the yielding force of a spring which is triggered by the loading of the paper magazine, and a lever holding mechanism for holding the lock cam in its unlock position after the return movement of the swing arm is completed.

For loading, the paper magazine is advanced along the magazine guides towards the paper feeder box with the leading end of the paper being released out from the outlet of the paper magazine. When the paper magazine comes to just before its loading position, the leading end of the paper is correctly fed into the paper inlet of the paper feeder box as being guided by the two, upper and lower, paper guides.

As the paper magazine is further advanced to its loading position, its causes the upper and lower paper guides to retract upward and downward respectively.

Simultaneously, the swing arm is pressed forward by the paper magazine for return action thus allowing the lever holding mechanism to release the lock cam. Then, the lock cam comes into engagement with the cam engaging projection of the paper magazine as being moved upward by the yielding force of the spring. Finally, the cam engaging projection remains pressed towards the paper feeder box by the lock cam in the loading mode.

BRIEF DESCRIPTION OF THE DRAWINGS

FIG. 6 is a cross sectional view of the lever holding mechanism in a locking movement; and FIG. 7 is a cross sectional view showing the loaded state of a paper magazine.

DETAILED DESCRIPTION OF THE PREFERRED EMBODIMENT

One preferred embodiment of the present invention will be described referring to the accompanying drawings.

Figure 1:
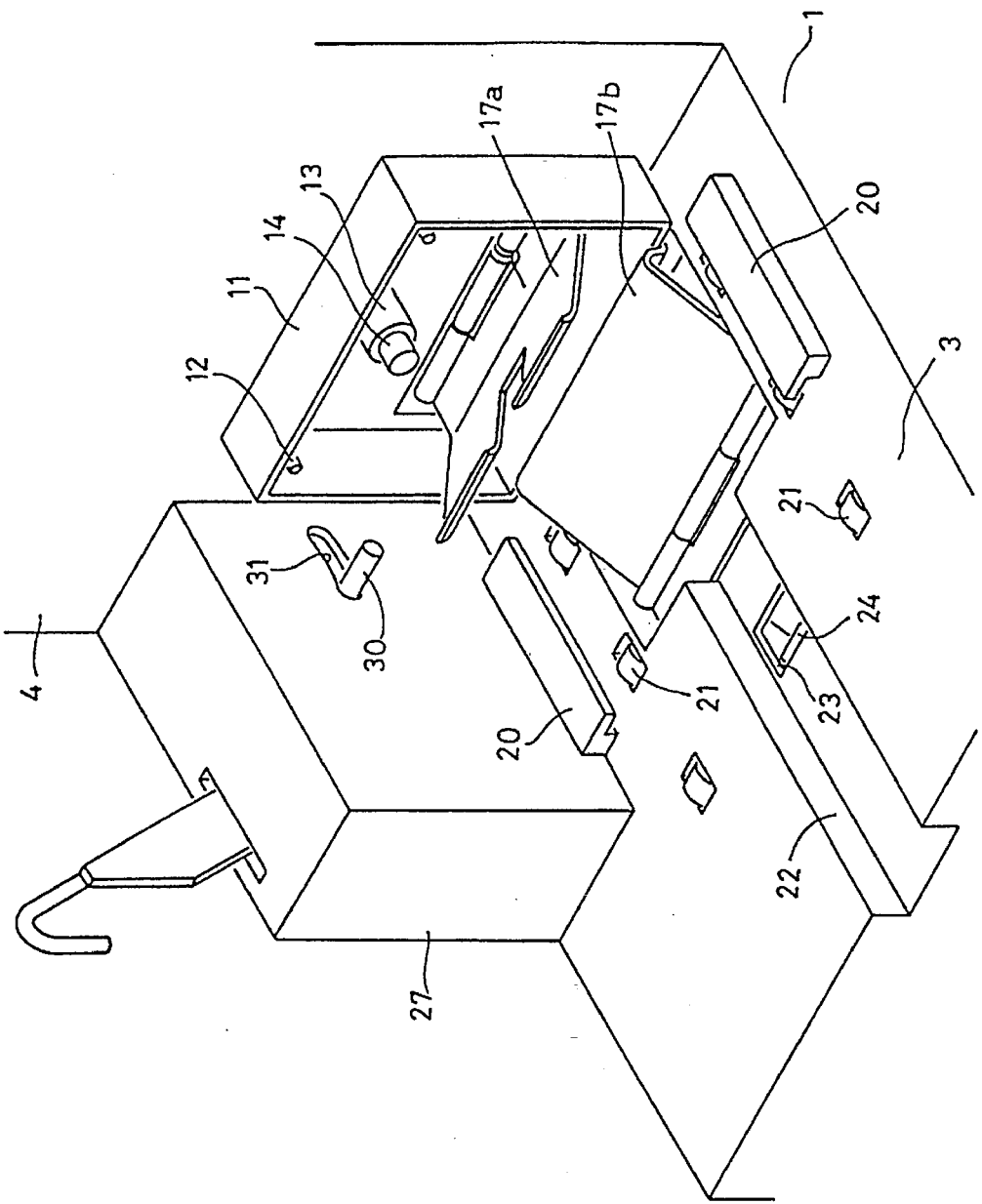
FIG. 1 is a perspective view of a support system showing one preferred embodiment of the present invention.
Figure 2:
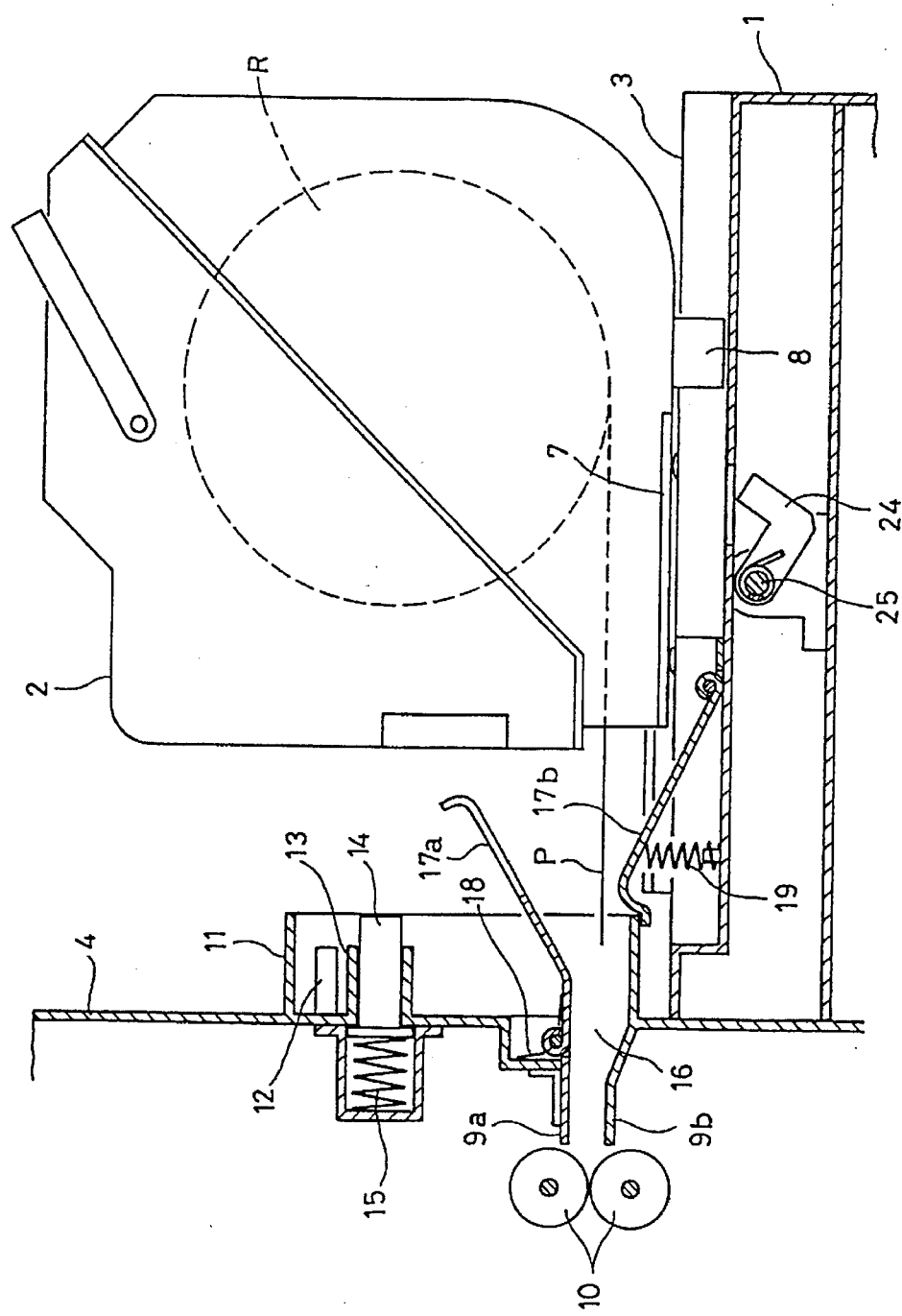
FIG. 2 is a longitudinal cross sectional view of the same.
Figure 3:
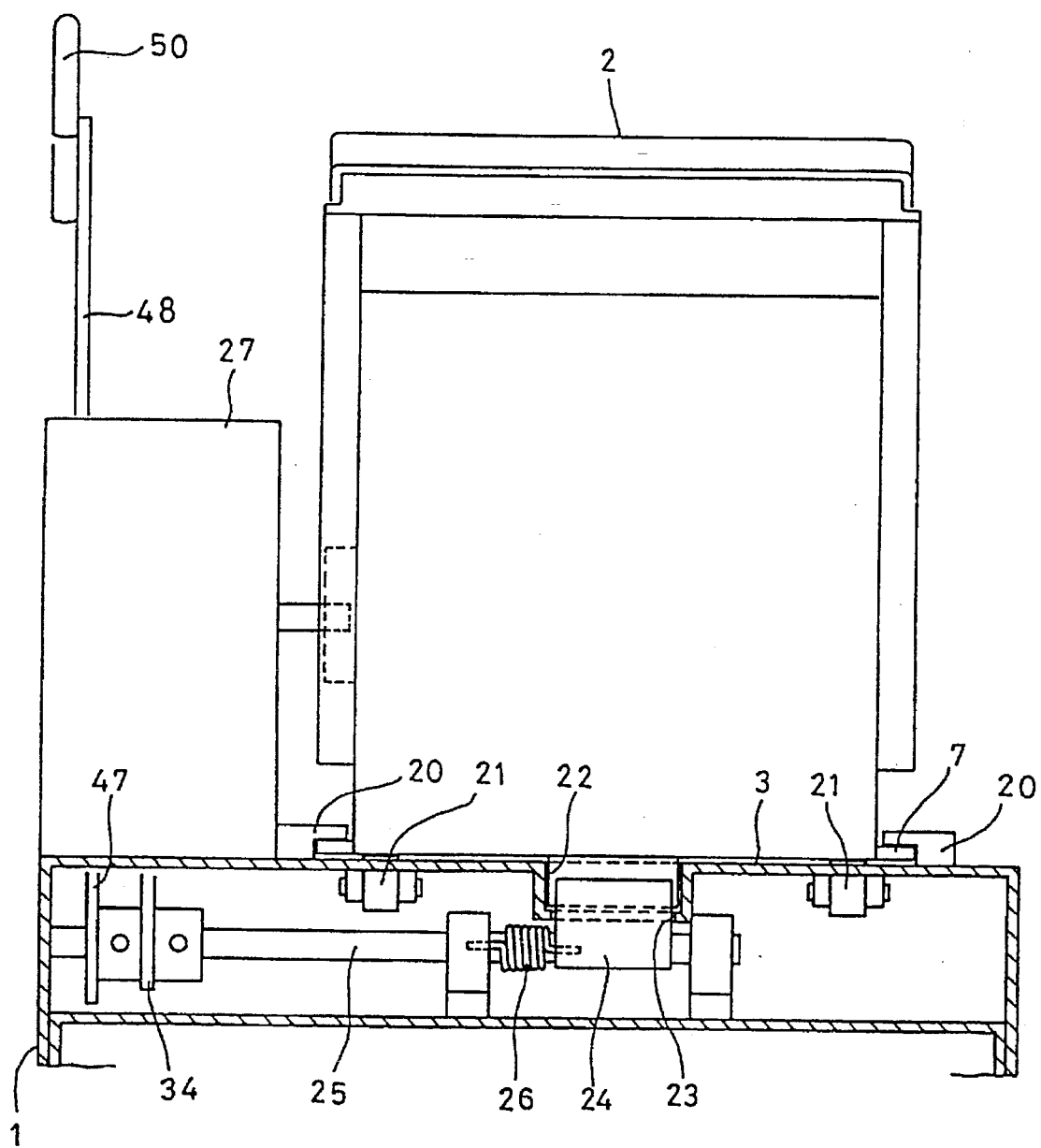
FIG. 3 is a cross sectional side view of the support system of FIG. 1.
Figure 4:
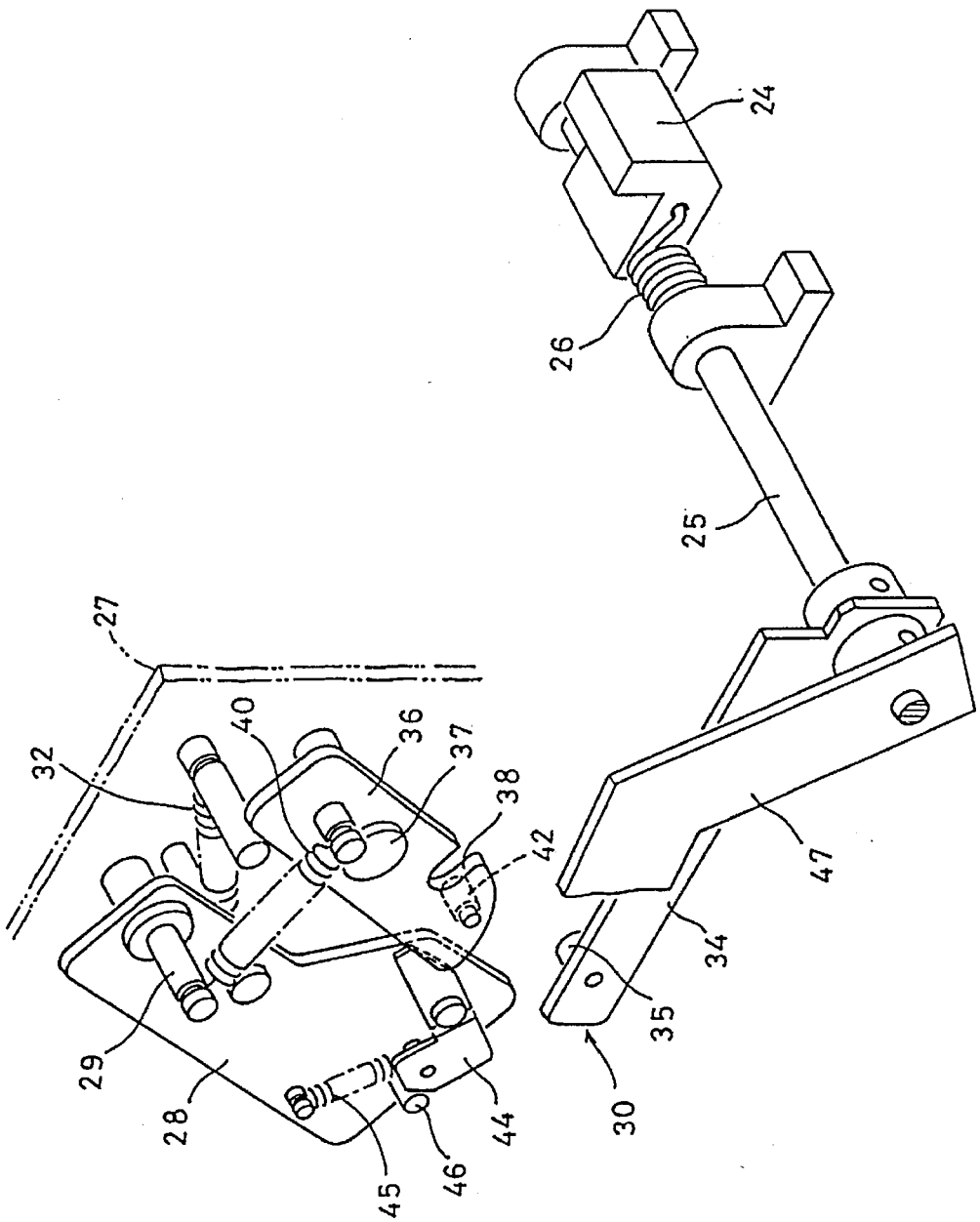
FIG. 4 is a perspective view of a lever holding mechanism of the same.

As shown in FIGS. 1 to 3, there are provided a paper magazine 2 placed on a substantially horizontal support surface 3 of an enclosure 1 in which an exposure unit is installed and a paper feeder box 4 disposed upright at the front end of the support surface 3.

The paper magazine 2 contains a paper roll R therein and has a recess 5 arranged in the front side thereof and a paper outlet 6 provided in the lower front side thereof that is surrounded by the recess 5, as illustrated in FIG. 7.

The paper magazine 2 has two flanges 7 mounted to both of the lowermost sides thereof, respectively, and a cam engaging projection 8 mounted to the rear bottom thereof, as shown in FIG. 2.

The paper feeder box 4 has an upper paper guide 9a, a lower paper guide 9b, and two, upper and lower, advancing rollers 10 disposed therein, as shown in FIG. 2. Also, a light blocking frame 11 is mounted to the front side of the paper feeder box 4 for insertion into the recess 5 of the paper magazine 2. The positioning of the frame 11 to the paper magazine 2 is determined by a plurality of positioning pins 12 and a guide tube 13 mounted inside the frame 11 on the paper feeder box 4. The guide tube 13 accommodates a plunger pin 14 urged outwardly by a spring 15.

A paper inlet 16 is provided beneath the light blocking frame 11 in the front side of the paper feeder box 4. Also, two, upper and lower, paper guides 17a, 17b are disposed in the front of the paper inlet 16.

The upper paper guide 17a is coupled at a proximal end thereof with the upper paper guide 9a inside the paper feeder box 4 for pivotal movement and remains held by an unshown stopper(s) so as to tilt up providing a front-down slope. The upper paper guide 17a is urged against the stopper(s) by the yielding force of a spring 18.

The lower paper guide 17b is pivotably mounted at a proximal end thereof and remains urged upwardly by a spring 19 so that its distal end is pressed against the lower side of the light blocking frame 11.

As shown in FIGS. 1 and 3, two magazine guides 20 are mounted on the support surface 3 for guiding the movement of the flanges 7 of the paper magazine 2.

There are a row of guide rollers 21 disposed beneath each the magazine guide 20. The guide rollers 21 are embedded such that their head portions only are projected from the support surface 3 to rotate as the paper magazine 2 travels directly thereon.

A guide recess 22 is provided between the two magazine guides 20 in the support surface 3 of the enclosure 1. The guide recess 22 has an opening 23 therein at its center, through which a lock cam 24 can project. The lock cam 24 is fixedly mounted to a shaft 25 disposed beneath the support surface 3 so that it can be moved to and from the guide recess 22 by the forward and reverse actions of the shaft 25. When the lock cam 24 is moved to the guide recess 22, it comes to directly engage with the cam engaging projection 8 of the paper magazine 2.

Also, the lock cam 24 remains urged in the direction of engagement by a spring 26 mounted on the shaft 25, and upon being engaged with the cam engaging projection 8, presses it towards the paper feeder box 4.

Figure 5:
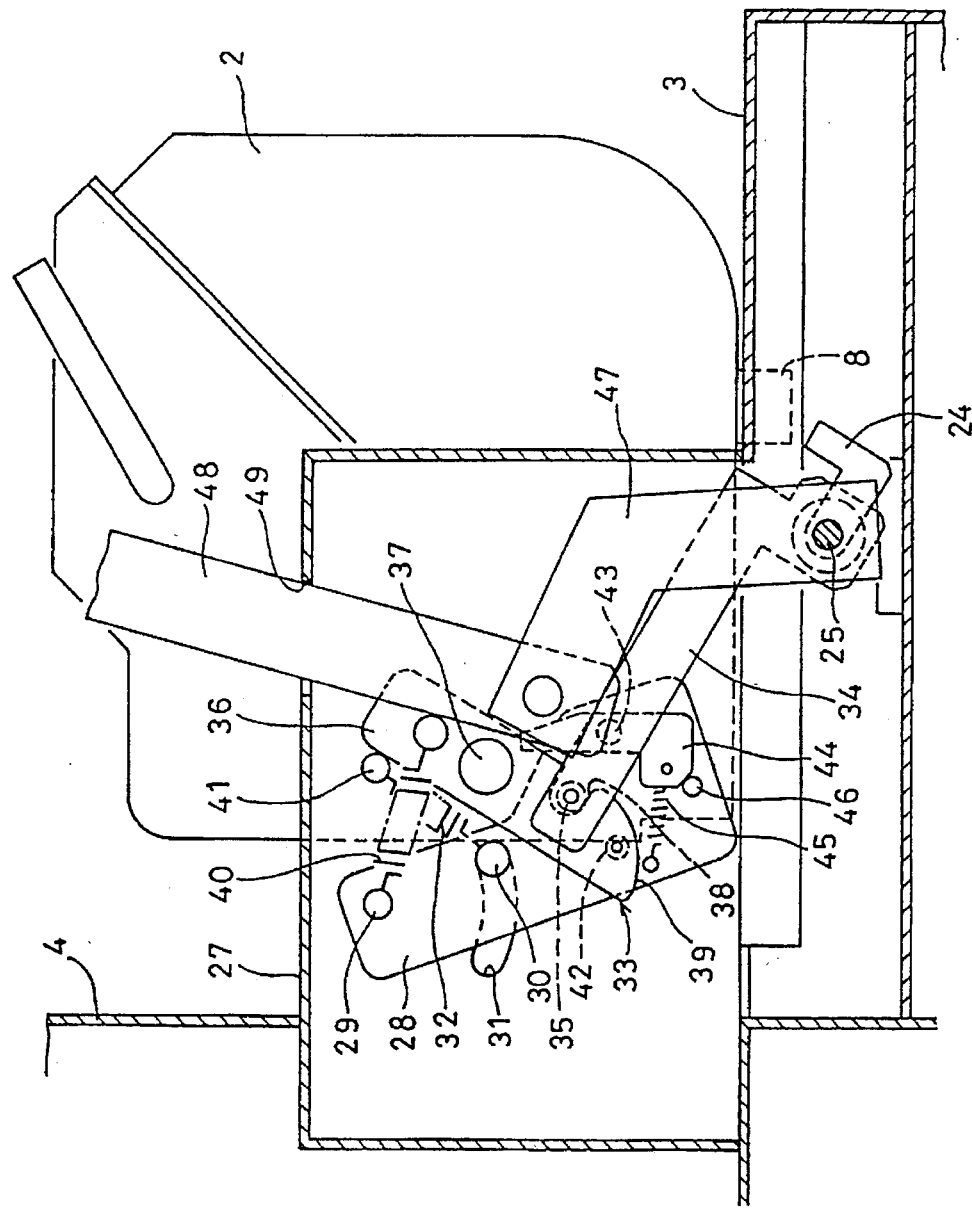
FIG. 5 is a cross sectional view of the lever holding mechanism of FIG. 4.

A lever casing 27 is mounted at one side of the passage of the paper magazine 2 along the two magazine guides 20. As shown in FIG. 5, there is provided a swing arm 28 in the lever casing 27.

The swing arm 28 is pivotably mounted at its upper end to a support pin 29 and has a center pin 30 mounted at the center thereof. The center pin 30 extends outwardly through an arcuate slot 31 provided in the inner, or paper magazine, side of the lever casing 27, toward the passage of the paper magazine 2. The swing arm 28 remains biased by a spring 32 so that the center pin 30 stays at one end of the arcuate slot 31.

Particularly, the lock cam 24 is maintained in its unlocked position by a lever mechanism 33 in the lever casing 27 that is actuated by the swing arm 28. The lever mechanism 33 comprises a lever 34 mounted at one end thereof to the shaft 25, an engaging pin 35 mounted to the other end of the lever 34, and an engaging arm 36 disposed above the lever 34 for pivotal movement about a pin 37. The engaging arm 36 has a notch 38 provided in a lower region thereof and a curved guiding edge 39 at a lower end thereof. The engaging arm 36 remains urged against a stopper 41 by a spring 40 while its notch 38 holds the engaging pin 35 of the lever 34 to thus retain the lock cam 24 at its unlocked position.

The engaging arm 36 has a pin 42 mounted on the lower region thereof. A pusher plate 44 is mounted at its center by a pin 43 to a lower region of the swing arm 28 and coupled at one end, a stopper end, with a spring 45 so that it is urged by the spring 45 against a stopper 46 mounted on a lower region of the swing arm 28. Accordingly, when the swing arm 28 is actuated by the forward movement of the paper magazine 2, its pusher plate 44 presses the pin 42 of the engaging arm 36 to allow the engaging pin 35 to disengage from the notch 38.

The shaft 25 is coupled at distal end with one end of a link arm 47, which is linked at its other end to the lower end of a handle arm 48. The upper end of the handle arm 48 is projected outwardly from an opening 49 provided in the upper side of the lever casing 27, as shown in FIG. 6. A handle 50 is mounted to the upper end of the handle arm 48.

For loading the paper magazine 2 onto the support surface 3 of the enclosure 1, the leading end of the paper P is fed out from the paper roll R and the paper magazine 2 is advanced towards the paper feeder box 4 with its flanges 7 running along the magazine guides 20.

FIG. 2 shows the paper magazine 2 advanced to a position just before reaching the positioning pins 12, while the leading end of the paper P fed out from the paper outlet 6 is guided with the upper and lower paper guides 17a, 17b.

As the paper magazine 2 is advanced further, it presses against the upper and lower paper guides 17a, 17b, which are thus lifted up and down, respectively.

At this time, the leading end of the paper P is passed through the paper inlet 16 to the internal paper guides 9a and 9b of the paper feeder box 4.

When the paper magazine 2 reaches and presses the pin 30 of the swing arm 28, as shown in FIG. 5, the swing arm 28 moves about the support pin 29, and the recess 5 of the paper magazine 2 comes into engagement with the light blocking frame 11 as shown in FIG. 7.

As the swing arm 28 moves, the pusher plate 44 mounted to the lower of the swing arm 28 presses against the pin 42 of the engaging arm 36. More specifically, the pusher plate 44 holds the counter-force of the pin 42, as it is supported at the rear end with the stopper 46. As the pin 42 is pressed by the pusher plate 44, the engaging arm 36 moves in the same direction as the swing arm 28, and its notch 38 releases the pin 35 of the lever 34. The lever 34 is thus turned downward by the yielding force of the spring 26 mounted on the shaft 25.

As the lever 34 is turned downward, the shaft 25 rotates and the lock cam 24 moves upward. The lock cam 24 then comes into direct contact with the lower side of the cam engaging projection 8 of the paper magazine 2, which travels just above the lock cam 24 at that moment.

Finally, as the paper magazine 2 is located in a given loading position determined by the positioning pins 12, its cam engaging projection, having passed over the lock cam 24, comes into engagement at its rear end with the lock cam 24, which has been turned upward in the locking direction by a combination of the weight of the lever 34 and the yielding force of the spring 26, and remains urged by the same towards the paper feeder box 4.

In particular, the lock cam 24 is located midway between the two magazine guides 20 so that it can press the widthwise center of the paper magazine 2 towards the paper feeder box 4.

Accordingly, even if the paper magazine 2 is slightly misaligned with the magazine guides 20, it is hardly biased, and is precisely secured in its loaded position by the holding of the positioning pins 12. The paper P will thus be prevented from winding during feeding.

Since the paper outlet 6 is located in the lowermost of the paper magazine 2, it will rarely depart from the paper inlet 16 of the paper feeder box 4 when the paper magazine 2 is tilted backward due to misalignment with the magazine guides 20. The paper P can also be forwarded to the advance rollers 10 with certainty and precision.

While the paper magazine 2 stays in its loaded position, it causes the plunger pin 14 to be retracted against the yielding force of the spring 15.

For unloading the paper magazine 2, the handle 50 shown in FIG. 6 is lifted up. As the lifting up of the handle 50 causes the handle arm 48 to turn upward, the link arm 47 is actuated to rotate the shaft 25 in the direction of the arrow shown in FIG. 6. Simultaneously, the lever 34 is turned upward and its engaging pin 35 comes into contact with the guide edge 39 of the engaging arm 36. Subsequently, the engaging arm 36 moves about the center pin 37 in the direction of the arrow shown in FIG. 6 until its notch 38 comes close to the pin 35 of the lever 34. Then, the engaging arm 36 is pressed by the yielding force of the spring 40, causing its notch 38 to accept the engaging pin 35. As a result, the lock cam 24 is held in its unlocked position, as shown in FIG. 5.

Then, the paper magazine 2 can easily be unloaded by removing it from the paper feeder box 4 along the magazine guides 20. In addition, the plunger pin 14 shown in FIG. 7 provides an initiative force to the paper magazine 2 for ease of the unloading.

What is claimed is:

1. A support system for supporting a paper magazine, comprising:

an enclosure having a support surface for supporting a paper magazine, said support surface having a front end;

a paper magazine having a top side, a bottom side and a front side, a paper outlet in a lower portion of said front side, and cam engaging projection mounted on said bottom side;

a paper feeder mechanism disposed at said front end of said support surface, said paper feeder mechanism having a paper inlet at a lower portion of said front end;

an upper paper guide and a lower paper guide both vertically pivotally mounted over said support surface in front of and on opposite sides of said paper inlet of said paper feeder mechanism, both said upper paper guide and said lower paper guide having respective springs biasing said upper paper guide and said lower paper guide toward the horizontal plane of said paper inlet;

a pair of magazine guides on said support surface for guiding said bottom side of said paper magazine;

a lock cam mounted between said pair of magazine guides and below said support surface for swinging movement between an engaged position in which said lock cam engages said cam engaging projection of said paper magazine and a disengaged position in which said lock cam is disengaged from said cam engaging projection, said lock cam comprising a spring urging said lock cam toward said engaged position so as to bias said cam engaging projection of said paper magazine toward said paper feeder mechanism in said engaged position;

a lever holding mechanism for holding said lock cam in said disengaged position; and a swing arm, engageable by said paper magazine, having a swing arm spring biasing said swing arm to a first position and being moveable by said paper magazine to a second position against the biasing force of said swing arm spring, wherein said swing arm is engageable with said lever holding mechanism to release said lock cam from being held in said disengaged position upon movement of said swing arm from said first to said second positions.

2. The support system of claim 1, wherein said lever holding mechanism comprises an engaging arm having a notch, said engaging arm being pivotally mounted relative to said enclosure, said lock cam has a lever connected for pivotal movement therewith, said lever having a pin on a distal end thereof receivable in said notch, and said swing arm comprises a pusher plate for engaging said engaging arm and causing said engaging arm to release said pin of said lever from said notch.

3. The support system of claim 1, wherein said engaging arm is biased to a pin holding position by an engaging arm spring, and is moveable to a release position by engagement of said pusher plate therewith and movement of said engaging arm against the bias force of said engaging arm spring.

4. A support system, comprising:

an enclosure having a support surface, said support surface having a front end;

a paper feeder mechanism disposed at said front end of said support surface, said paper feeder mechanism having a paper inlet at a lower portion of said front end;

an upper paper guide and a lower paper guide both vertically pivotally mounted over said support surface in front of and on opposite sides of said paper inlet of said paper feeder mechanism, both said upper paper guide and said lower paper guide having respective springs biasing said upper paper guide and said lower paper guide toward the horizontal plane of said paper inlet;

a pair of magazine guides on said support surface;

a lock cam mounted between said pair of magazine guides and below said support surface for swinging movement between an engaged position in which said lock cam projects above said support surface and a disengaged position in which said lock cam is below said support surface, said lock cam comprising a spring urging said lock cam toward said engaged position;

a lever holding mechanism for holding said lock cam in said disengaged position; and a swing arm, engageable by a paper magazine, having a swing arm biasing said swing arm to a first position and being moveable by the paper magazine to a second position against the biasing force of said swing arm spring, wherein said swing arm is engageable with said lever holding mechanism to release said lock cam from being held in said disengaged position upon movement of said swing arm from said first to said second positions.

5. The support system of claim 4, wherein said lever holding mechanism comprises an engaging arm having a notch, said engaging arm being pivotally mounted relative to said enclosure, said lock cam has a lever connected for pivotal movement therewith, said lever having a pin on a distal end thereof receivable in said notch, and said swing arm comprises a pusher plate for engaging said engaging arm and causing said engaging arm to release said pin of said lever from said notch.

6. The support system of claim 5, wherein said engaging arm is biased to a pin holding position by an engaging arm spring, and is moveable to a release position by engagement of said pusher plate therewith and movement of said engaging arm against the bias force of said engaging arm spring.

* * * * *